Patented July 9, 1946

2,403,709

UNITED STATES PATENT OFFICE 2,403,709

PRODUCTION OF ORGANIC PEROXIDES

Frank H. Dickey, Oakland, Calif., and Edward R. Bell, Norwalk, Ohio, assignors to Shell Development Company, San Francisco, Calif., a corporation of Delaware No Drawing. Application March 13, 1944, Serial No. 526,333

14 Claims. (Cl. 260—610)

The present invention relates to a novel process for the production of certain organic peroxides, and more particularly pertains to a process for the production of organic peroxides in which each of the oxygen atoms of the peroxy (—O—O—) group is attached to like or different organic radicals, at least one of which is directly linked to its peroxy oxygen atom via a tertiary carbon atom of aliphatic or alicyclic character, i. e. a carbon atom which is directly attached to three other carbon atoms. In one of its more specific embodiments the invention provides a process for the formation of dialkyl peroxides in which one of the alkyl radicals is directly attached to the peroxy oxygen atom via a tertiary carbon atom, while the other alkyl radical is attached to its peroxy oxygen atom via a carbon atom which may be primary, secondary or tertiary, so that the resulting dialkyl peroxide is either symmetrical or unsymmetrical.

It has been discovered by one of us that a novel class of compounds comprising the metal salts of tertiary organic hydroperoxides, particularly the alkali metal and alkaline earth metal salts of tertiary organic hydroperoxides, may be formed by the interaction of a tertiary organic hydroperoxide, such as a saturated tertiary alkyl hydroperoxide, with a base (preferably a strong base) of the metal of which the metal salt is desired. For instance, it was found that an alkali metal hydroxide, e. g. sodium hydroxide or potassium hydroxide, may be reacted with tertiary butyl hydroperoxide to produce the corresponding alkali metal salt of this hydroperoxide. Similarly, the alkaline earth metal salts of the tertiary alkyl hydroperoxides may be formed by reacting the tertiary hydroperoxide with an alkaline earth metal hydroxide, e. g. barium, calcium or strontium hydroxide.

It has now been discovered that the above and other metal salts of tertiary organic hydroperoxides, i. e. organic hydroperoxides in which the organic radical is directly attached to the peroxy radical via a tertiary carbon atom, may be reacted with organic halides, and particularly with alkyl monohalides, this interaction resulting in the substitution of the organic radical of the organic halide for the metal of the salt, thereby producing peroxides in which at least one of the radicals is of a tertiary character, while the other may be either primary, secondary or tertiary depending on the particular organic halide employed. The symmetrical and asymmetrical organic peroxides formed according to the process of the present invention are particularly useful compounds. For example, they may be used as additives to improve the cetane value of Diesel engine fuels. Also, these peroxides may be employed individually or in admixtures with one another or with other substances as catalysts for various chemical reactions. Thus, they may be used for the polymerization of polymerizable unsaturated compounds including both the conjugated and the non-conjugated unsaturated polymerizable compounds.

Any metal salt of a tertiary organic hydroperoxide may be used as one of the reagents in the process of the present invention. A sub-class of compounds which fall within the above class comprises the alkali metal and the alkaline earth metal salts of tertiary organic hydroperoxides. In the case of the alkali metal salts, these reactants have the general formula

wherein M represents an alkali metal, e. g. sodium, lithium or potassium, while R is a tertiary organic grouping, i. e. an organic radical in which the carbon atom directly attached to the peroxy oxygen atom is also directly linked to three other carbon atoms. A group of compounds which are particularly suitable for use in the process of this invention comprises the alkali metal salts of saturated alkyl hydroperoxides of the general formula

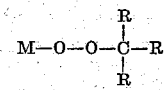

wherein M is an alkali metal, e. g. sodium, potassium or lithium, and each R represents a like or different saturated aliphatic radical, e. g. methyl, ethyl, n-propyl, isopropyl, n-butyl, etc. radical. The following are illustrative examples of such metal salts: sodium tertiary butyl peroxide, potassium tertiary butyl peroxide, sodium tertiary amyl peroxide, potassium tertiary amyl peroxide, barium salts of tertiary butyl hydroperoxide and of tertiary amyl hydroperoxide, and the like, and their higher homologues. Other metal salts, e. g. aluminum salts, of the above hydroperoxides are additional examples. These hydroperoxides may contain various organic and/or inorganic groups or radicals, such as aryl, aralkyl, alicyclic radicals, as well as halogen atoms and the like, substituted for one or more of the hydrogen atoms on the various carbon atoms of the organic radical.

Although any organic halide may be used as the substance which is reacted with the mentioned metal salts of the tertiary organic hydroperoxides, the process is especially suitable when applied to the use of saturated alkyl monohalides. These halides may be primary, secondary or tertiary, the following being illustrative examples of such monohalogenated (i. e. monofluorinated, monochlorinated, monobrominated or monoiodinated) derivatives of paraffins which may be reacted with the specified metal salts: methyl halides, ethyl halides, n-propyl halides, isopropyl halides, n-butyl halides, tertiary butyl halides, amyl halides, and the like, and their homologues and analogues and suitable substitution products. Another group of organic halides suitable for the production of the organic peroxides comprises the alicyclic halides, particularly the saturated alicyclic halides, e. g. cyclopropyl, cyclobutyl, cyclopentyl, cyclohexyl, etc. halides, as well as their substituted derivatives of the type in which one or more alkyl radicals are substituted for one or more of the hydrogen atoms of the polymethylene compound. Still another group comprises the aryl, aralkyl and alkaryl halides, the halobenzenes, benzyl halides and tolyl halides being specific examples of the group. The process of the present invention also includes the interaction of acyl halides with the metal salts of tertiary organic peroxides. For instance, the reaction of acetyl chloride with sodium tertiary butyl peroxide, when effected according to this process, yields sodium chloride and tertiary butyl peracetate.

The organic peroxides of the class described herein are preferably formed by interacting the organic halide with the metal salt of a tertiary organic hydroperoxide in the presence of a solvent in which the metal halide salts, which are formed as a by-product, are not appreciably soluble. It has been discovered that when the aforesaid reaction is conducted in the presence of such a solvent the yields of the desired organic peroxide are much higher as compared to those obtained when the reaction is effected in the absence of the solvent. Besides the better yields obtainable, another advantage in employing a solvent having the above characteristics is that it provides a ready means for separating the metal halide salt. Thus, after the reaction has been completed, the salt may be filtered from the reaction mixture, or may be removed therefrom by water washing, and the desired organic peroxide may then be recovered, e. g. by distillation, from the remaining liquid mixture without the inherent difficulties of distilling a mixture containing salt, such as the decomposition and caking of the salt on the heating surfaces of the still, etc. It is preferred to employ a solvent in which both of the reactants, i. e. the metal salt of the tertiary organic hydroperoxide and the organic halide, are substantially or appreciably soluble. This maintains the reaction mixture in a homogeneous state with only a single liquid phase. While the reaction may be carried out in a two-phase system, better results are generally obtained when only one phase exists.

The most suitable solvent for use in executing the process of the invention, besides being a non-solvent for the metal halide salt and at least a partial solvent for the organic reactants, should be substantially inert under the reaction conditions. Particular compounds which are suitable to be employed in the present process include isopropyl alcohol, normal propyl alcohol, normal butyl alcohol, secondary butyl alcohol, isobutyl alcohol, tertiary butyl alcohol, the amyl alcohols, etc. Also, ketones of the type of acetone, methyl ethyl ketone, etc., may be used. The dioxanes, such as dioxane, 2,5-dimethyl dioxane-1,4, 2,5-diethyl dioxane-1,4, tetramethyl dioxane, etc are also a group of solvents which may be employed. Furthermore, at least in some cases, solvent mixtures of the type of ethyl alcohol and benzol, ethyl alcohol and toluol, and isopropyl alcohol and benzol, are also suitable.

The process of the invention may be executed in a variety of modes. A tertiary organic hydroperoxide, e. g. tertiary butyl hydroperoxide, may be taken and the metal salt thereof may be formed by reacting it with a metal hydroxide. For this purpose, the metal hydroxide may be employed per se or in solution, e. g. an aqueous solution, or in suspension. Furthermore, this reaction may be conducted in the presence of a solvent in which the metal salt of the hydroperoxide is insoluble. The resulting metal salt of the tertiary organic hydroperoxide is then reacted with an organic halide of the above-defined class. The last-mentioned reaction may be effected within a wide range of operating temperatures, the optimum temperature depending on a number of variables, e. g. the specific reactants employed, the presence or absence of a solvent, the particular solvent used, etc. Generally, the temperature will vary between about room temperature, e. g. 25° C. or even below, and the initial boiling temperature of the mixture. It is sometimes preferred to employ relatively high operating temperatures, particularly in cases where the use of lower temperatures would prevent the presence of a single phase system. With the higher temperatures it may be desirable to employ superatmospheric pressures in order to keep the reaction products and solvent substantially in the liquid phase. The second reaction, i. e. the formation of the organic peroxides by the reaction of the organic halides with the metal salt of the specified hydroperoxides, is generally conducted in the presence of the solvent. The proportion of the solvent employed in this reaction mixture will also depend upon a number of variables such as the properties of the particular solvent, the desirability of maintaining a single liquid phase, the temperature at which the reaction is carried out, etc. Upon completion of the reaction, the metal halide salt may be removed from the reaction mixture by filtration, washing, decantation, centrifugation, etc. After washing of the remaining liquid phase, the organic peroxide may then be recovered from the remaining organic phase, this recovery being preferably effected by distillation.

The following examples illustrate the process of the present invention, but are not to be construed as limitative in any sense.

*Example I*

Approximately 175 parts by volume of a 60% solution of tertiary butyl hydroperoxide in tertiary butyl alcohol were dissolved in about 200 parts by volume of acetone. The solution was cooled to a temperature of about 0° C., and approximately 75 parts by volume of a 45% aqueous potassium hydroxide solution were then slowly added to the first solution. This resulted in the formation of a precipitate which was filtered at the above-mentioned temperature. The precipitate thus recovered was washed twice with small amounts of acetone, and then dried with air. An analysis of this precipitate showed that it was potassium tertiary butyl peroxide. This crystalline salt was then dissolved in a mixture consisting of 100 parts by volume of isopropyl bromide and 150 parts by volume of isopropyl alcohol. The reaction mixture was allowed to stand for about 15 hours during which time it precipitated copious amounts of potassium bromide formed as a by-product from the interaction of isopropyl bromide with the potassium salt of tertiary butyl hydroperoxide.

The mixture formed as a result of an interaction of the above-mentioned reactants was washed repeatedly with water, then with a 25% aqueous sulfuric acid solution, and finally again with water. The remaining organic phase was steam distilled to recover separately the fraction boiling at a temperature of about 81.5° C. An analysis of this fraction showed that it comprises isopropyl tertiary butyl peroxide, the structural formula of which is $$\begin{array}{c}\text{CH}_3 \quad\quad \text{CH}_3 \\ | \quad\quad\quad | \\ \text{HC}-\text{O}-\text{O}-\text{C}-\text{CH}_3 \\ | \quad\quad\quad | \\ \text{CH}_3 \quad\quad \text{CH}_3\end{array}$$

This asymmetrical mixed dialkyl peroxide was identified with the following properties:

Refractive index, $n_D^{20}$_____ 1.3862
Carbon_____per cent__ 63.4 (theoretical, 63.6)
Hydrogen_____do____ 12.2 (theoretical, 12.1)
Oxygen_____do____ 24.4 (theoretical, 24.3)
Molecular weight_____ 140 (theoretical, 132)

Example II

The sodium salt of tertiary butyl hydroperoxide was formed by reacting tertiary butyl hydroperoxide with an aqueous sodium hydroxide solution at approximately ice temperature, the precipitated sodium salt being filtered, washed and dried substantially in the same manner as that employed in the preceding example for the recovery of the corresponding potassium salt.

The sodium tertiary butyl peroxide formed was then mixed with a solution consisting of isopropyl bromide and isopropyl alcohol. Since the salt did not dissolve completely in this solution, the mixture was subjected to distillation with total refluxing for a period of about three hours. The resulting mixture was then washed repeatedly with water, then with a 15% aqueous sulfuric acid solution, and finally with water. The organic phase thus separated was subjected to steam distillation to recover a substantial yield of a fraction boiling at about 81° C. This fraction, after washing and drying, had a refractive index, $n_D^{20} = 1.3864$, and was found to be isopropyl tertiary butyl peroxide.

Example III

Instead of reacting the potassium salt of tertiary butyl hydroperoxide with isopropyl bromide, the desired isopropyl-tertiary butyl peroxide can be produced by using the above-mentioned potassium salt and isopropyl chloride. This reaction, effected preferably in the presence of isopropyl alcohol employed as a solvent for the reactants, causes the precipitation of potassium chloride, the organic phase formed as a result of this interaction containing appreciable amounts of isopropyl tertiary butyl peroxide.

Example IV

When the potassium salt of tertiary amyl hydroperoxide is reacted with isopropyl bromide under conditions similar to those described in Example I, the corresponding isopropyl tertiary amyl peroxide having the general structural formula $$\begin{array}{c}\text{CH}_3 \quad\quad \text{CH}_3 \\ | \quad\quad\quad | \\ \text{HC}-\text{O}-\text{O}-\text{C}-\text{C}_2\text{H}_5 \\ | \quad\quad\quad | \\ \text{CH}_3 \quad\quad \text{CH}_3\end{array}$$

may be produced.

In like manner many other symmetrical and unsymmetrical organic peroxides, in which at least one of the organic radicals is attached to the peroxy radical via a tertiary carbon atom, may be formed. For example, the substances listed below may be reacted with each other to produce the organic peroxides listed:

| Reactants | Organic peroxide |
|---|---|
| Sodium tertiary butyl peroxide and ethyl bromide. | Ethyl tertiary butyl peroxide. |
| Potassium tertiary butyl peroxide and n-propyl iodide. | n-Propyl tertiary butyl peroxide. |
| Potassium tertiary butyl peroxide and tertiary butyl chloride. | Di-tertiary butyl peroxide. |
| Sodium tertiary amyl peroxide and ethyl iodide. | Ethyl tertiary amyl peroxide. |
| Potassium tertiary amyl peroxide and n-amyl bromide. | Amyl-tertiary amyl peroxide. |

Also, instead of using the alkali metal salts of the tertiary organic hydroperoxides, the desired organic peroxides may be formed by using the corresponding alkaline earth metal salts, e. g. barium salts, and even salts of other metals, such as the aluminum salts of tertiary alkyl hydroperoxides.

We claim as our invention:

1. A process for the production of isopropyl tertiary butyl peroxide which comprises contacting the potassium salt of tertiary butyl hydroperoxide with isopropyl bromide in the presence of isopropyl alcohol, effecting said contacting at substantially ordinary temperatures and for a period of time sufficient to effect the formation of isopropyl tertiary butyl peroxide, separating the potassium bromide formed as a by-product, and distilling the isopropyl tertiary butyl peroxide from the remaining liquid phase.

2. A process for the production of isopropyl tertiary butyl peroxide which comprises contacting the sodium salt of tertiary butyl hydroperoxide with isopropyl bromide in the presence of isopropyl alcohol, effecting said contacting under refluxing conditions for a period of time sufficient to effect the formation of isopropyl tertiary butyl peroxide, separating the sodium bromide formed as a by-product, and distilling the isopropyl tertiary butyl peroxide from the remaining liquid phase.

3. A process for the production of isopropyl tertiary butyl peroxide which comprises contacting an alkali metal salt of tertiary butyl hydroperoxide with isopropyl bromide in the presence of isopropyl alcohol, effecting said contacting at a temperature at which substantially a single liquid phase exists in the reaction zone, separating the alkali metal bromide formed as a by-product, and distilling isopropyl tertiary butyl peroxide from the remaining liquid phase.

4. A process for the production of dialkyl peroxides which comprises contacting an alkali metal salt of a tertiary alkyl hydroperoxide with an alkyl bromide in the presence of isopropyl alcohol, effecting said contacting under temperature and pressure conditions sufficient to maintain a substantially single liquid phase in the reaction zone, separating the alkali metal bromide formed as a by-product, and distilling the dialkyl peroxide from the remaining liquid phase.

5. A process for the production of dialkyl peroxide which comprises contacting an alkali metal salt of a tertiary alkyl hydroperoxide with an alkyl halide in the presence of an inert solvent in which the alkali metal halide salt is substantially insoluble, effecting said contacting under temperature and pressure conditions sufficient to maintain a substantially single liquid phase, removing the alkali metal halide salt thus formed as a by-product from the reaction mixture, and recovering the dialkyl peroxide from the remaining liquid phase.

6. A process for the production of dialkyl peroxides which comprises contacting an alkali metal salt of a tertiary alkyl hydroperoxide with an alkyl monohalide in the presence of an inert solvent in which the alkali metal halide salt is substantially insoluble, removing the alkali metal halide salt formed as a by-product from the reaction mixture, and recovering the dialkyl peroxide from the remaining reaction mixture.

7. A process for the production of dialkyl peroxides which comprises contacting a compound having the general structural formula

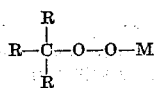

wherein each R is an alkyl radical and M is an element of the group consisting of alkali metals and alkaline earth metals, with an alkyl monohalide in the presence of an inert solvent in which the metal halide salt is substantially insoluble, removing the metal halide salt formed as a by-product from the reaction mixture, and recovering the dialkyl peroxide from the remaining reaction mixture.

8. A process for the production of organic peroxides which comprises reacting a compound of the group consisting of the alkali metal and alkaline earth metal salts of the tertiary alkyl hydroperoxides with a halo-substituted hydrocarbon of the group consisting of the alkyl, cycloalkyl, monocyclic aryl, monocyclic aralkyl and monocyclic alkaryl halides.

9. A process for the production of organic peroxides which comprises reacting a compound of the group consisting of the alkali metal and alkaline earth metal salts of the tertiary alkyl peroxides with a saturated monohalogenated hydrocarbon.

10. A process for the production of organic peroxides which comprises reacting a compound of the group consisting of the alkali metal and alkaline earth metal salts of the tertiary alkyl peroxides with an alkyl halide.

11. A process for the production of organic peroxides which comprises reacting an alkali metal salt of tertiary butyl hydroperoxide with a halo-substituted hydrocarbon of the group consisting of the alkyl, cycloalkyl, monocyclic aryl, monocyclic aralkyl and monocyclic alkaryl halides.

12. A process for the production of organic peroxides which comprises reacting an alkali metal salt of tertiary butyl hydroperoxide with an alkyl halide.

13. A process for the production of organic peroxides which comprises reacting an alkaline earth metal salt of tertiary butyl hydroperoxide with a halo-substituted hydrocarbon of the group consisting of the alkyl, cycloalkyl, monocyclic aryl, monocyclic aralkyl and monocyclic alkaryl halides.

14. A process for the production of organic peroxides which comprises reacting an alkaline earth metal salt of tertiary butyl hydroperoxide with an alkyl halide.

FRANK H. DICKEY.
EDWARD R. BELL.